US012539094B2

(12) United States Patent
Litvin

(10) Patent No.: US 12,539,094 B2
(45) Date of Patent: Feb. 3, 2026

(54) PREDICTION OF EXTREMA OF RESPIRATORY MOTION AND RELATED SYSTEMS, METHODS, AND DEVICES

(71) Applicant: Analogic Corporation, Peabody, MA (US)

(72) Inventor: Andrew Litvin, Peabody, MA (US)

(73) Assignee: Analogic Corporation, Peabody, MA (US)

( * ) Notice: Subject to any disclaimer, the term of this patent is extended or adjusted under 35 U.S.C. 154(b) by 85 days.

(21) Appl. No.: 17/452,159

(22) Filed: Oct. 25, 2021

(65) Prior Publication Data
US 2023/0126963 A1 Apr. 27, 2023

(51) Int. Cl.
*A61B 6/00* (2024.01)
*G06T 7/277* (2017.01)

(52) U.S. Cl.
CPC .............. *A61B 6/541* (2013.01); *G06T 7/277* (2017.01); *G06T 2207/10081* (2013.01); *G06T 2207/20081* (2013.01); *G06T 2207/30061* (2013.01)

(58) Field of Classification Search
CPC ......... A61B 6/541; A61B 6/032; G06T 7/277; G06T 2207/10081; G06T 2207/20081; G06T 2207/30061
See application file for complete search history.

(56) References Cited

U.S. PATENT DOCUMENTS

| 4,387,722 A * | 6/1983 | Kearns ................... A61B 5/316 600/529 |
| 2005/0113673 A1* | 5/2005 | Avinash ................. A61B 6/541 600/509 |

(Continued)

FOREIGN PATENT DOCUMENTS

| DE | 102010006981 A1 * | 8/2011 | ........... A61B 6/4435 |
| KR | 20160018989 A * | 2/2016 | |

OTHER PUBLICATIONS

Hong, S. M., B. H. Jung, and D. Ruan. "Real-time prediction of respiratory motion based on a local dynamic model in an augmented space." Physics in Medicine & Biology 56.6 (2011): 1775. (Year: 2011).*

(Continued)

*Primary Examiner* — Sean D Mattson
(74) *Attorney, Agent, or Firm* — TraskBritt

(57) ABSTRACT

Prediction of extrema in respiratory motion and related systems, methods, and devices is disclosed. A method of detecting extrema in respiratory motion includes generating a predicted motion trajectory of respiratory motion, identifying one or more extrema candidates of the motion of the patient responsive to the predicted motion trajectory, and selecting one or more of the one or more extrema candidates to be one or more predicted extrema of the respiratory motion of the patient. An apparatus includes an input terminal configured to receive a respiratory waveform signal and one or more processors configured to generate predictions of extrema of the respiratory waveform signal before occurrences of the extrema. An imaging system includes a gating signal generator configured to predict extrema of a respiratory waveform and an imaging device configured to capture images of a patient responsive to a respiratory gating signal from the gating signal generator.

17 Claims, 6 Drawing Sheets

(56) References Cited

U.S. PATENT DOCUMENTS

| | | | | |
|---|---|---|---|---|
| 2005/0201510 A1* | 9/2005 | Mostafavi | .............. | A61B 5/113 |
| | | | | 378/8 |
| 2011/0009761 A1* | 1/2011 | Ruan | .................... | A61N 5/1049 |
| | | | | 600/529 |
| 2015/0002331 A1* | 1/2015 | Allmendinger | ........ | A61B 5/113 |
| | | | | 600/595 |
| 2015/0073765 A1* | 3/2015 | Boettger | ................. | G16Z 99/00 |
| | | | | 703/11 |
| 2015/0310625 A1* | 10/2015 | Shimamura | ............ | A61B 6/507 |
| | | | | 382/132 |
| 2017/0216627 A1* | 8/2017 | Brooks | ................ | A61N 5/1037 |
| 2017/0238895 A1* | 8/2017 | Hofmann | ............... | A61B 5/087 |
| 2018/0218502 A1* | 8/2018 | Golden | ..................... | G06T 7/11 |
| 2019/0378329 A1* | 12/2019 | Kiely | ................... | A61N 5/1049 |
| 2021/0133984 A1* | 5/2021 | Sun | ..................... | G06F 18/2178 |

OTHER PUBLICATIONS

Ramrath et al, Prediction of Respiratory Motion With A Multi-Frequency Based Extended Kalman Filter, International Journal of Computer Assisted Radiology and Surgery, Jun. 2007, 4 pages.

\* cited by examiner

PREDICTION OF EXTREMA OF RESPIRATORY MOTION AND RELATED SYSTEMS, METHODS, AND DEVICES

TECHNICAL FIELD

This disclosure relates generally to prediction of extrema of respiratory motion of a patient, and more specifically to generation of respiratory gating signals responsive to predicted extrema of respiratory motion.

BACKGROUND

Respiratory gate signals (gates) are used for respiratory gated computerized tomography (CT) scanners. Four-dimensional CT (4DCT) is an example of a CT scanning technology that uses gates to trigger image capture at specific points in time, enabling tracking of motion over a full range of motion. Gates are utilized for validating respiratory monitoring device readiness, for triggering X-ray devices in prospective scan mode, and for image reconstruction in retrospective scan mode. Respiratory gate signals may also be used to enhance visualization of the respiratory waveform on the user interface display of the CT scanner.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
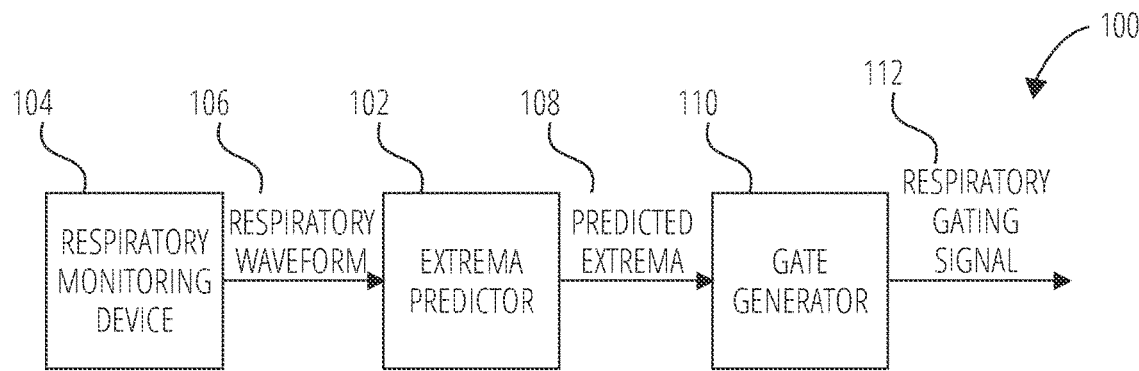
FIG. 1 is a block diagram of a gating signal generator, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Respiratory gated CT scan mode, also referred to as 4DCT, uses a respiratory waveform signal and a respiratory "gates" signal. Respiratory gates indicate timing of extrema (e.g., maximums, minimums, or both) of the respiratory waveform. Respiratory gates are also used for X-ray gating and time-dependent (e.g., 4th dimension of 4DCT) image reconstruction. These should be detected in real time with good accuracy and low latency using a respiratory monitoring device. Certain respiratory monitoring devices use advanced algorithms to produce a gating signal (gates), while other devices do not produce a gating signal or have a poor-quality gating signal. Rather than rely on gating signals from respiratory monitoring device, which may provide poor quality gating signals, or even no gating signals, embodiments disclosed herein may include CT systems that generate their own gating responsive to substantially real-time respiratory waveforms. Respiratory gate signals may also be used to enhance visualization of the respiratory waveform on the user interface display of the CT scanner.

In image acquisition of a patient's lungs, considerable motion artifacts may be present due to movement of the lungs during the respiratory cycle. Similar to imaging of a cardiac cycle, it may be desirable to scan the patient's lungs at certain phases (e.g., extrema) of the respiratory cycle. Imaging of the lungs may be useful in various capacities from locating nodules in the patient's pulmonary system to performing radiotherapy treatments, without limitation. When the patient breathes during a scan many respiratory artifacts in the image data may prevent a radiation oncologist from obtaining desired information. If the patient is asked to hold his or her breath during scanning and pulmonary gating is not used, the radiation oncologist may not be certain as to whether the patient held his or her breath at a desired level during the scan.

In some CT applications, image reconstruction may be performed while averaging data over a pre-determined time interval, such as one breathing period or a multiple thereof.

Pulmonary gating is used for creating a dataset that represents a patient's anatomy at a reproducible breath level. It is also used for creating multi-phase datasets, which show motion of the entire thorax throughout the respiratory cycle. As a result, four different modes may be used in pulmonary scanning.

Disclosed herein is respiratory gate detection. In some embodiments, top and bottom respiration extrema (gates) are detected from at least substantially real-time respiratory waveform data with high accuracy and low latency. Some embodiments disclosed herein are based, at least in part, on physical-based Kalman filter models and a multi-scale adaptive extrema detector and refiner. Some embodiments disclosed herein may operate on real-time CT scanner processors such as an embedded multi-processor of an FPGA. Some embodiments disclosed herein may be used for any respiratory monitoring device producing real-time respiratory waveform. Alternative modalities and deployment options are also disclosed.

A small period of time may pass between the occurrence of an extremum (e.g., a maximum or a minimum) in a respiratory waveform signal and a detection of the extreme. Still more time may pass before an action, such as capture of an image (e.g., using a CT scanner), occurs responsive to the detection of the extreme. If a brief period of time passes between occurrence of the extremum and image capture, body motion may have advanced back to a non-extreme position by the time the image is captured. As a result, images captured in this way may not accurately illustrate a full range of motion that occurs over the course of a respiratory cycle of a patient.

Some embodiments disclosed herein may predict a future extreme in a respiratory waveform signal, rather than detect a present or past extreme, to trigger an action, such as capture of an image (e.g., using a CT scanner), at a predicted time of the extremum. Since extrema are predicted in advance, the actions (e.g., capture of an image) may be triggered at substantially the same times as the extrema. As a result, captured images may more accurately illustrate a full range of motion that occurs over the course of a respiratory cycle of a patient as compared to those captured using gates based on present or past detection of extrema.

Some embodiments disclosed herein include a respiratory gating system for real-time, robust, high accuracy, and low latency detection of respiratory waveform extrema. Some embodiments disclosed herein may include the use of a motion physics-based Kalman filter to derive a predicted motion trajectory, short time scale features to identify raw waveform extrema (extrema candidates), and medium time scale features to filter raw extrema (rejecting false extrema and accepting true extrema) to identify predicted extrema. One or more thresholds may be used to filter the raw extrema from the extrema candidates to identify the predicted extrema. In some embodiments, adaptive learning of the motion trajectory may be used to adapt the thresholds in filtering the raw extrema. In some embodiments, other approaches other than a motion physics-based Kalman filter may be used to determine a predicted motion trajectory, as will be discussed herein. By way of non-limiting example, a predicted motion trajectory may be generated using a trained machine-learning framework (e.g., trained using a respiratory waveform and imaging data) responsive to image data and without the use of a dedicated respiratory monitoring device (e.g., after training).

In some embodiments, respiratory gate detection may be general purpose. In other words, some embodiments disclosed herein may be used with any respiratory monitoring device producing real-time respiratory waveforms. Some embodiments disclosed herein may be designed to produce gating signals that are robust (e.g., robust to irregular breathing, fast or slow breathing, outliers), that are accurate in time, and that have low detection latency (e.g., substantially zero detection latency).

FIG. 1 is a block diagram of a gating signal generator 100, according to some embodiments. The gating signal generator 100 includes a respiratory monitoring device 104, an extrema predictor 102, and a gate generator 110. The respiratory monitoring device 104 is configured to provide a respiratory waveform 106 responsive to monitoring respiration of a patient (not shown). The extrema predictor 102 is configured to predict extrema of the respiratory waveform 106 before occurrences of the extrema and indicate the predicted extrema 108 to the gate generator 110. The gate generator 110 is configured to generate a respiratory gating signal 112 responsive to the predicted extrema 108.

Since the respiratory gating signal 112 is based, at least in part, on predicted extrema 108, gating triggered by the respiratory gating signal 112 may be substantially aligned in time with extrema of motion due to the respiratory cycle of the patient, assuming that the predictions for the predicted extrema 108 are accurate. Accordingly, any imaging triggered by the respiratory gating signal 112 would be expected to illustrate substantially a full range of motion of the patient.

The extrema predictor 102 and gate generator 110 may be implemented and deployed on any of various platforms and components. By way of non-limiting example, the extrema predictor 102 and the gate generator 110 may be integrated together with the respiratory monitoring device 104. A respiratory monitoring device 104 thus including the extrema predictor 102 and the gate generator 110 may be universally used with different imaging systems (e.g., CT systems) or radiation planning systems that take the respiratory gating signal 112 as an input. Also, by way of non-limiting example, the extrema predictor 102 may be integrated together with an imaging system, which provides the ability to update the extrema predictor 102 and the gate generator 110 more easily and reduces the cost of the respiratory monitoring device 104. As another non-limiting example, the extrema predictor 102 and the gate generator 110 may be integrated into a radiation therapy system. As a further non-limiting example, the extrema predictor 102, the gate generator 110, or both may be implemented in the cloud (e.g., at a remote server in communication with the respiratory monitoring device 104, an imaging system, a radiation therapy system, or combinations thereof).

The respiratory monitoring device 104 may be implemented using any of various approaches. By way of non-limiting examples, the respiratory monitoring device 104 may be implemented using a laser range finder (LIDAR), ultrasound reflection timing measurement, a radio frequency range finder (Radar), pneumatic sensor (e.g., an inflatable device wrapped around the chest of the patent to detect pressure changes), optical computer vision-based-target on a chest of the patient (e.g., a camera captures images of the target and computes a position), projection data from the X-ray imaging device, or combinations thereof.

Figure 2:
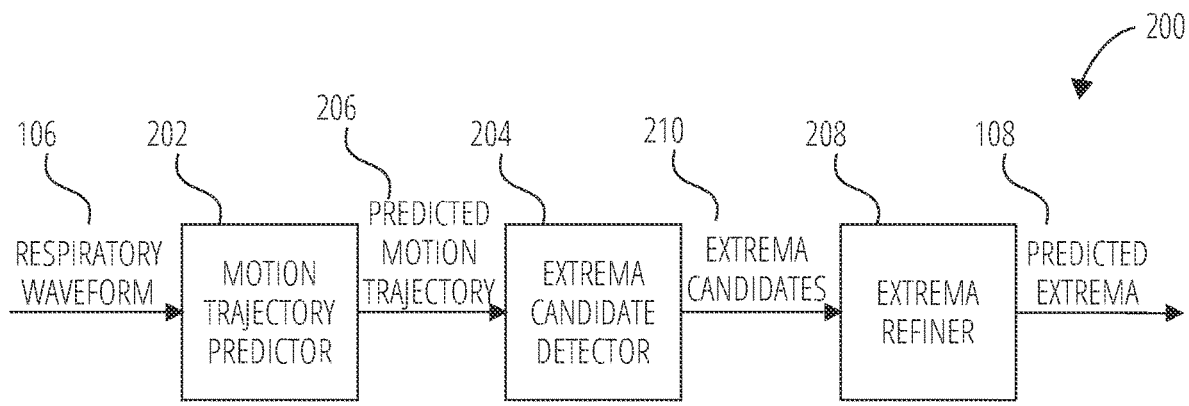
FIG. 2 is a block diagram of an extrema predictor, which is an example of an extrema predictor of the gating signal generator of FIG. 1, according to some embodiments.

FIG. 2 is a block diagram of an extrema predictor 200, which is an example of the extrema predictor 102 of FIG. 1, according to some embodiments. The extrema predictor 200 includes a motion trajectory predictor 202, an extrema candidate detector 204, and an extrema refiner 208. The motion trajectory predictor 202 is configured to receive the respiratory waveform 106 and generate a predicted motion trajectory 206 of a patient responsive to the respiratory waveform 106. The motion trajectory predictor 202 may use any of various approaches to generate the predicted motion trajectory 206.

By way of non-limiting example, the motion trajectory predictor 202 may use a motion model-based predictive Kalman filter to generate the predicted motion trajectory 206. The motion model-based predictive Kalman filter may be based on a physical model of respiratory motion. The predicted motion trajectory 206 that is generated using this model may be a smoothed motion trajectory. A process model used for the Kalman filter may include three parameters of chest wall motion, including position, velocity, and acceleration. These parameters may be linked using a linear update model. A Gaussian observation model may be used. The process model and the observation model parameters may be adaptively adjusted based on patient breathing rate using mapping. The mapping may be derived using either a manual training approach, an adaptive learning algorithm via machine- or deep-learning approaches, or both manual training and an adaptive learning algorithm.

Also, by way of non-limiting example, the motion trajectory predictor 202 may use a predictive filtering approach based on direct application of adaptive learning (e.g., without application of a physics-based model). One approach for doing so is to use a neural network algorithm trained on real data. In such an approach, the ground truth (smooth motion trajectory) may be obtained using a filter (e.g., a finite impulse response (FIR) filter).

The extrema candidate detector 204 is configured to receive the predicted motion trajectory 206 from the motion trajectory predictor 202 and generate extrema candidates 210 (e.g., raw peak and/or valley predictions) of the respiratory waveform 106 responsive to the predicted motion trajectory 206. Various different approaches may be used to generate the extrema candidates 210. By way of non-limiting example, the extrema candidate detector 204 may evaluate the predicted motion trajectory 206 and derive the extrema candidates 210 using short time scale features computed from the predicted motion trajectory 206. Short time scale features may be implemented as a local filter kernel applied to the predicted motion trajectory 206.

The extrema refiner 208 is configured to receive the extrema candidates 210 from the extrema candidate detector 204 and generate predicted extrema 108 responsive to the extrema candidates 210. The extrema refiner 208 may accept or reject the extrema candidates 210. The decision as to which of the extrema candidates 210 should be accepted as predicted extrema 108 may be performed using any of various different approaches. By way of non-limiting example, the decision may be based on one or more medium time scale features. As a specific, non-limiting example, extrema (peak and valley) masses may be compared with adaptive thresholds. Adaptive thresholds for the extrema candidates 210 may be learned in real time using long time scale processing to refine the thresholds based on patient breathing properties (e.g., statistical metrics computed on refined extrema). As another specific, non-limiting example, temporal properties of the extrema candidates 210 may be analyzed relative to a history of past-measured extrema.

The extrema predictor 200 is configured to predict extrema (predicted extrema 108) of the respiratory waveform 106 from substantially real-time samples of the respiratory waveform 106. The predicted extrema 108 may include peaks corresponding to full inhalation and valleys corresponding to full exhalation. The peaks may be used as top triggers for a respiratory gating signal (e.g., the respiratory gating signal 112 of FIG. 1). By way of non-limiting example, a discrete signal may be asserted for the waveform sample of the respiratory waveform 106 corresponding to the detected top trigger and de-asserted for the next sample of the respiratory waveform 106. Similarly, the valleys may be used as bottom triggers for the respiratory gating signal (e.g., the respiratory gating signal 112 of FIG. 1). By way of non-limiting example, a discrete signal may be asserted for the waveform sample of the respiratory waveform 106 corresponding to the detected bottom trigger and de-asserted for the next sample. Accordingly, a respiratory gating signal such as the respiratory gating signal 112 of FIG. 1 may, in some embodiments, include a top trigger signal and a bottom trigger signal.

As a specific, non-limiting example, the extrema predictor 200 may be implemented using as a function called for each incoming respiratory sample of the respiratory waveform 106. The function may include an initialization mode of operation and a normal mode of operation. The function may use an ensemble of internal variables having values that are preserved between calls. Variables discussed below are included in these internal variables until defined otherwise as local variables.

An interface may be defined with inputs and outputs. The inputs include an operation mode OP, a sample time dT (e.g., in milliseconds), and an incoming respiratory waveform sample S. The outputs may include a trigger flag TRIG, which may take a value of "1" for a peak (or "top"), a value of "−1" for a valley (or "bottom"), and a value of "0" for none (neither a peak or a valley).

In the initialization mode of operation, which may be set by setting an operational mode variable OP to "0," an initialization call is performed under the following conditions: 1) a first sample is received following device connection, and 2) a set response command SET RESP is received with a reset flag RESET asserted. The following variables are initialized in the initialization mode of operation: 1) a process covariance matrix ($P^r_{t1} = P^r_{t1}\_INIT$), 2) a process state vector ($x^r_{t1} = [S0\ 0]$), 3) initial previous samples (Gprev=1000 and Ypast=S), 4) counters and intermediate values (LVY=S, LPY=S, LPC=1, LVC=1, PC=0, and VC=0), 5) Peak and valley arrays (peak_array=zeros (PV_length) and valley_array=zeros (PV_length), and 6) initial indices (peak_array_ind=1 and valley_array_ind=1).

In the normal mode of operation, which may be set by setting the operation mode variable OP to "1," for each incoming sample of the respiratory waveform 106, the following operations may be performed: 1) respiratory samples array is updated using the current sample (YY (BufInd)=S), 2) operating value of process noise covariance is computed (Qop=Q*PNoiseMult), 3) Kalman prediction (Kalman gain may be computed as $K_t = P^r_{t1} * H' * (H * P^r_{t1} * H' + R)^{-1}$, predicted process state vector may be computed as ($x^r t = x^r_{t1} + K_t * (S - H * x^r_{t1})$), and predicted covariance matrix may be computed as $P^r_t = P^r_{t1} - K_t * (H * P^r_{t1})$), 4) Kalman update (updated process state vector may be computed as $x^r_{t1} = A * x^r_{t1}$ and updated process covariance matrix may be computed using operating process noise covariance matrix as $P^r_{t1} = A * P^r_t * (A' + Qop)$, 5) gradient computation ($G = x^r_{t1}(1) - Ypast$), 6) record current waveform sample (Ypast=$x^r_{t1}(1)$), 7) peak detection, 8) valley detection, 9) sample counter from last peak updated (LPC=min (LPC+1,BL)), 10) sample counter from last valley is updated (LVC=min (LVC+1,BL)), and previous value of the gradient is recorded (Gpast=G).

Operation 9) of the normal mode of operation may be performed using the following algorithm:

```
If (G<0 && Gpast >= 0)
    // Peak mass computation
    if (LPC < LVC)
        ind = ( [ (BufInd-LPC) . . BufInd] +BL) %BL + 1
        PM = Σsign (YY [ind] -LPY) * (YY [ind] -LPY)²
        T = LPC * dT * T_min_TH_SC
    else
        ind = ( [ (BufInd -LVC) . . BufInd] +BL) %BL + 1
        PM = Σsign (YY [ind] -LVY) * (YY [ind] -LVY)²
        T = LVC * dT
    end
    // Median non-zero is computed
    MNZ = median of non-zero elements in array
"peak_array"
    // Detection criteria
    if (PM>TH_CUTOFF*MNZ && T>T_min_TH && PM>MASS_TH
        if (PC>0)
            TRIG=1 // TOP detect
            // adaptive model
            // P2p interval is bounded
            PP = min(max(LPC * dT,PP_MIN,PP_MAX)
            // process noise multiplier
```

$$PNoiseMult = \left(\frac{1}{PP - PPpar1} - PPpar2\right) * PPpar3$$

```
        end
        // peak counter is incremented
        PC ++
        // peak mass is inserted into peak mass array
        peak_array(peak_array_ind) = PM
        // Peak array index is incremented
        peak_array_ind ++
        // Peak array index is wrapped around
        peak_array_ind = peak_array_ind % PV_length
        // samples counter from last peak is reset
        LPC = 0
        // Last peak sample value is reset
        LPY = YY (BufInd)
    end
end
```

Operation 10) of the normal mode of operation may be performed using the following algorithm:

```
If (G>0 && Gpast<=0)
    // Valley mass computation
    if (LPC < LVC)
            ind = ([(BufInd-LPC)..BufInd]+BL)%BL + 1
            VM = Σsign(YY[ind]-LPY)* (YY[ind]-LPY)²
            T = LPC * dT
        else
            ind = ([(BufInd -LVC)..BufInd]+BL)%BL + 1
            VM = Σsign(YY[ind]-LVY)* (YY[ind]-LVY)²
            T = LVC * dT * T_min_TH_SC
        end
        // Median non-zero is computed
        MNZ = median of non-zero elements in array
"valley_array"
        // Detection criteria
        if (VM>TH_CUTOFF*MNZ && T>T_min_TH && VM<-MASS_TH)
            if (PC>0)
                TRIG=-1 // BOTTOM detect
            end
            // valley counter is incremented
            VC ++
            // valley mass is inserted into valley mass
array
            valley_array(valley_array_ind) = VM
            // Valley array index is incremented
            valley_array_ind ++
            // Valley array index is wrapped around
            valley_array_ind = valley_array_ind % PV_length
            // samples counter from last valley is reset
            LVC = 0
            // Last valley sample value is reset
            LVY = YY(BufInd)
        end
    end
```

Figure 3:
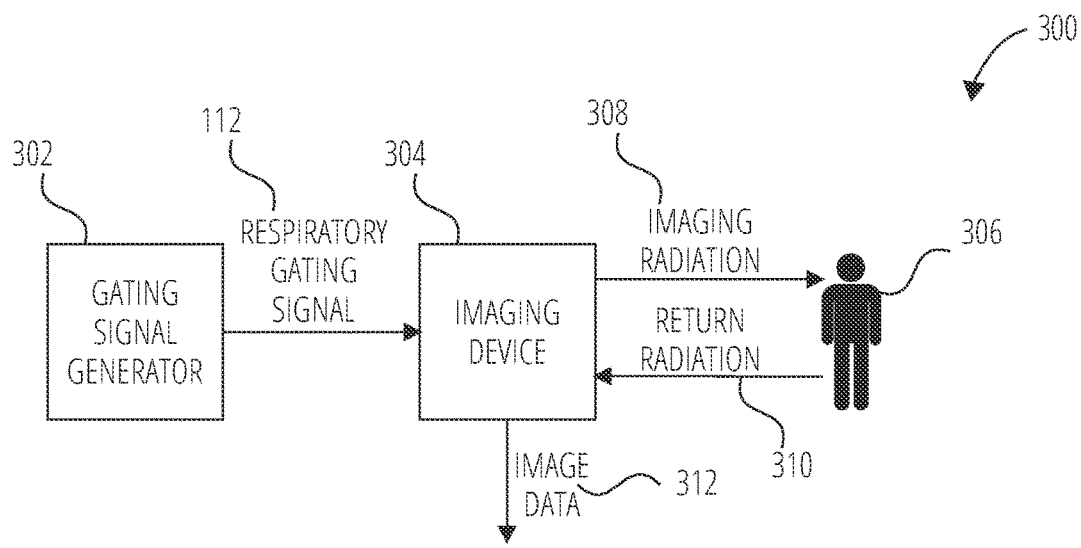
FIG. 3 is a block diagram of an imaging system, according to some embodiments.

FIG. 3 is a block diagram of an imaging system 300, according to some embodiments. The imaging system 300 includes a gating signal generator 302 (e.g., the gating signal generator 100 of FIG. 1) and an imaging device 304. The imaging device 304 is configured to provide imaging radiation 308 to a patient 306 and receive return radiation 310 responsive to providing the imaging radiation 308 to the patient 306. The gating signal generator 302 is configured to provide a respiratory gating signal 112 to the imaging device 304 substantially in temporal alignment with predicted extrema (e.g., the predicted extrema 108 of FIG. 1) in respiratory motion of the patient 306. The extrema may correspond to a fully inhaled state of the patient 306, a fully exhaled state of the patient 306, or both.

The imaging device 304 is configured to capture images of the patient 306 responsive to the respiratory gating signal 112. The images may be constructed using the return radiation 310, and the imaging device 304 may generate image data 312 for the captured images. Since the respiratory gating signal 112 is substantially temporally aligned with predicted extrema in respiratory motion of the patient 306, it is expected that the captured images indicated by the image data 312 may show the patient 306 near or at extrema of respiratory motion.

The imaging device 304 may be any of various different imaging devices. By way of non-limiting examples, the imaging device 304 may include a CT scanner, a magnetic resonance imaging (MRI) scanner, an X-ray device, an ultrasound device, a positron emission tomography (PET) scanner, other imaging devices, or combinations thereof.

Figure 4:
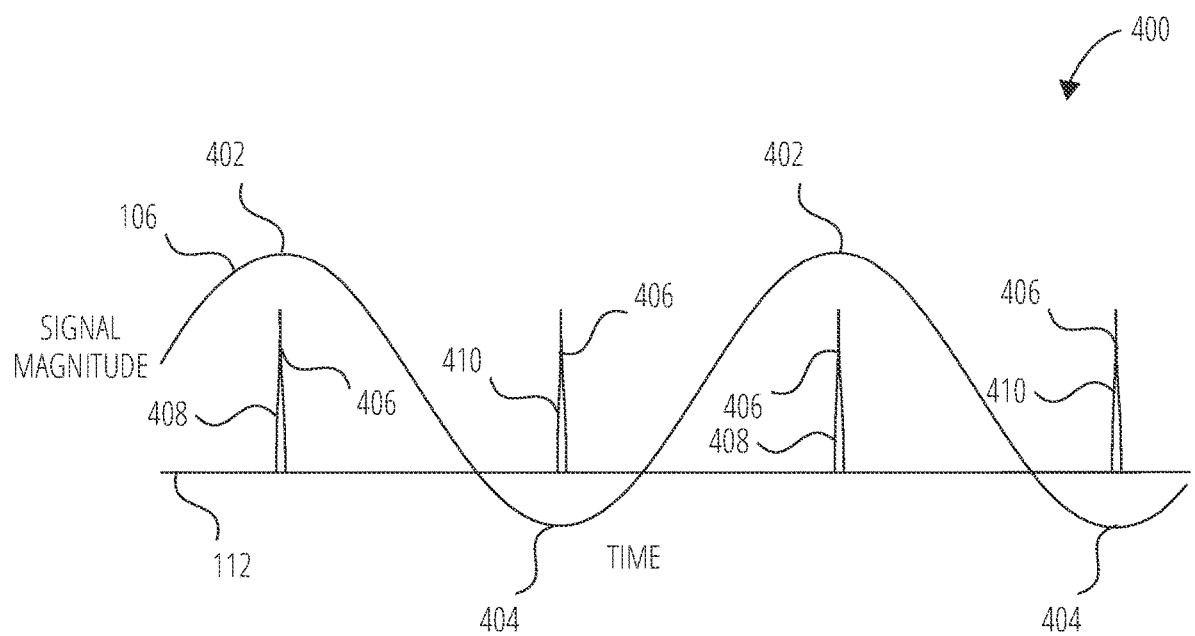
FIG. 4 is a plot illustrating examples of idealized versions of signals of the gating signal generator of FIG. 1, according to some embodiments.

FIG. 4 is a plot illustrating examples of idealized versions of signals 400 of the gating signal generator 100 of FIG. 1, according to some embodiments. The signals 400 include idealized versions of the respiratory waveform 106 and the respiratory gating signal 112 plotted as signal magnitudes (e.g., voltage potentials, electrical currents) against time. The respiratory gating signal 112 includes a top trigger signal 408 and a bottom trigger signal 410.

The respiratory waveform 106 may oscillate over time. In FIG. 4 the respiratory waveform 106 is simplified to be a simple sinusoidal waveform. Of course, in practice a respiratory waveform measured from a patient will not be a perfect sinusoidal waveform, but the sinusoidal waveform for the respiratory waveform 106 in FIG. 4 is used merely for illustrative purposes. The respiratory waveform 106 may include extrema such as peaks 402 and valleys 404, which may correspond to fully inhaled states and fully exhaled states, respectively, of a patient. The respiratory gating signal 112 includes assertions 406 at the extrema of the respiratory waveform 106 (e.g., at the peaks 402 and valleys 404). The top trigger signal 408 may be asserted at the peaks 402 and the bottom trigger signal 410 may be asserted at the valleys 404. The assertions 406 may trigger an imaging device (e.g., the imaging device 304 of FIG. 3) to capture images at the extrema of the respiratory waveform 106.

The top trigger signal 408 and the bottom trigger signal 410 may be passed onto control circuitry of medical equipment. By way of non-limiting example, the top trigger signal 408 and the bottom trigger signal 410 may be served via an electrocardiogram (ECG) data server structure. A rising edge of the top trigger signal 408 may be used to drive a respiratory state machine. Also, the top trigger signal 408 and the bottom trigger signal 410 may be used for respiratory triggering in respiratory devices.

Figure 5:
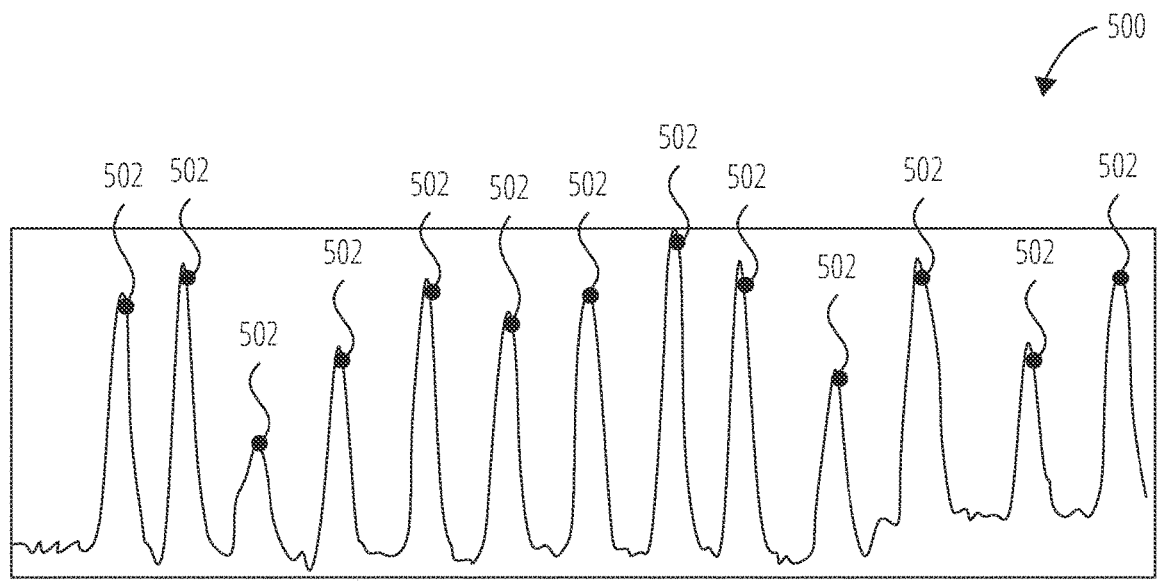
FIG. 5 is a plot of a respiratory waveform, which is an example of the respiratory waveform of FIG. 1.

FIG. 5 is a plot of a respiratory waveform 500, which is an example of the respiratory waveform 106 of FIG. 1. FIG. 5 also illustrates predicted extrema 502 of the respiratory waveform 500, which are examples of the predicted extrema 108 of FIG. 1 and FIG. 2. The predicted extrema 502 illustrated in FIG. 5 are predicted peaks of the respiratory waveform 500 generated by an extrema predictor such as the extrema predictor 102 of FIG. 1 or the extrema predictor 200 of FIG. 2.

Figure 6:
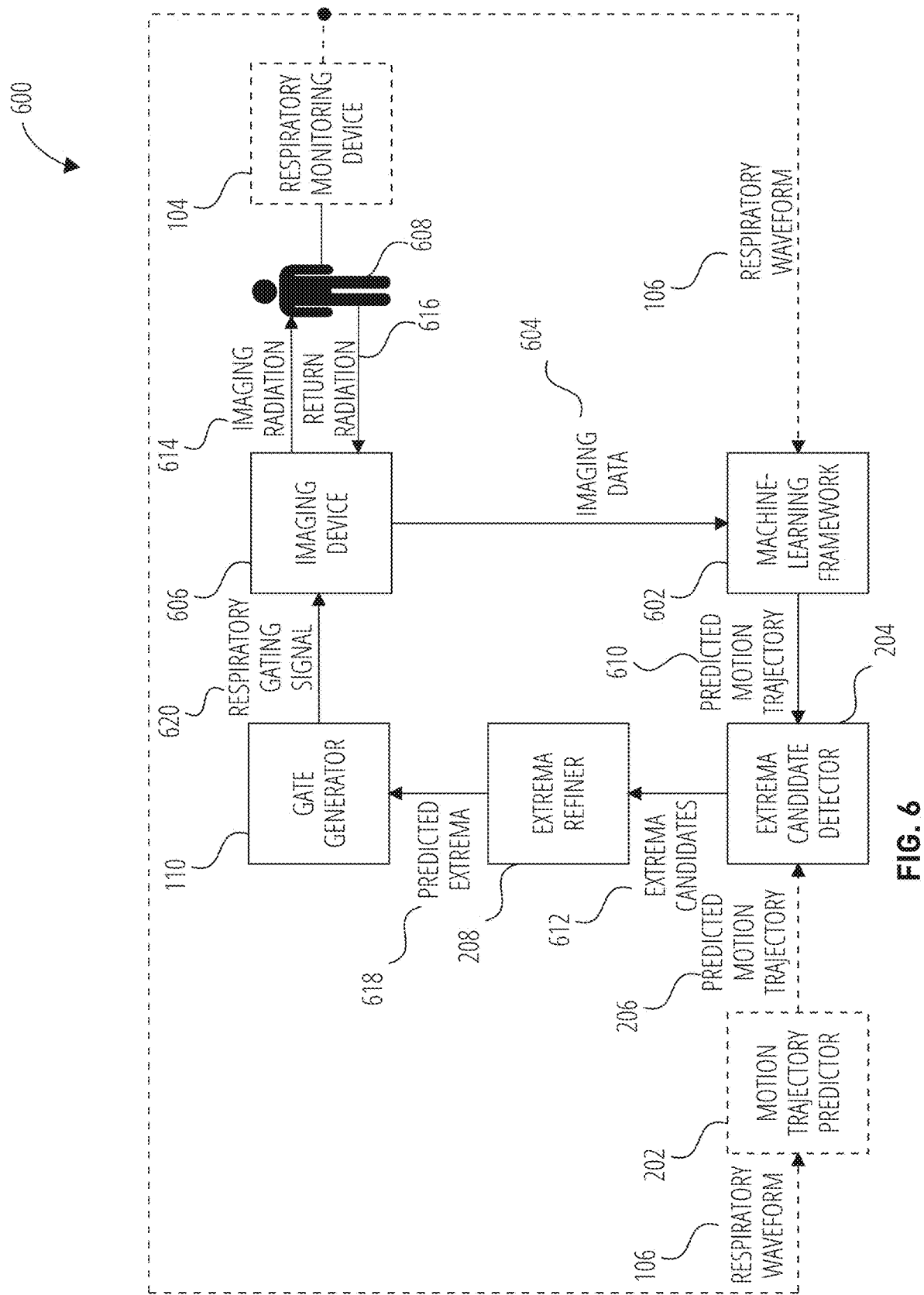
FIG. 6 is a block diagram of another imaging system, according to some embodiments.

FIG. 6 is a block diagram of another imaging system 600, according to some embodiments. The imaging system 600 includes an imaging device 606 similar to the imaging device 304 of FIG. 3. Similar to the imaging device 304, the imaging device 606 may be configured to provide imaging radiation 614 to a patient 608 and detect return radiation 616 from the patient 608 responsive to the imaging radiation 614. The imaging device 606 may provide imaging data 604 responsive to the return radiation 616.

Similar to the gating signal generator 100 of FIG. 1, the imaging system 600 may include a respiratory monitoring device 104 and a gate generator 110. The gate generator 110 is configured to provide a respiratory gating signal 620 to the imaging device 606. The respiratory gating signal 620 is configured to trigger the imaging device 606 to capture images substantially at predicted extrema of respiratory motion of the patient 608. Accordingly, similar to the extrema predictor 200 of extrema predictor 200, the imaging system 600 may include a motion trajectory predictor 202, an extrema candidate detector 204, and an extrema refiner 208 to provide predicted extrema 618 to the gate generator 110 responsive to the respiratory waveform 106 from the respiratory monitoring device 104. The motion trajectory predictor 202 may generate a predicted motion trajectory 206 responsive to the respiratory waveform 106, the extrema candidate detector 204 may identify extrema candidates 612 responsive to the predicted motion trajectory 206, and the extrema refiner 208 may select the predicted extrema 618 from the extrema candidates 612, as discussed above with reference to the extrema predictor 200 of FIG. 2.

In contrast to the extrema predictor 200 of FIG. 2, the imaging system 600 may include a machine-learning framework 602 (e.g., using a deep-learning algorithm) configured to generate a predicted motion trajectory 610 that the extrema candidate detector 204 may use to identify the extrema candidates 612 instead of, or in addition to, the predicted motion trajectory 206 provided by the motion trajectory predictor 202. The machine-learning framework 602 enables derivation of the predicted motion trajectory 610 without using a dedicated respiratory monitoring device 104 (e.g., once the machine-learning framework 602 is trained). During a learning phase, the machine-learning framework 602 may use the imaging data 604 from the imaging device 606 (e.g., 4DCT scan mode data) and the respiratory waveform 106 to learn correlations between the imaging data 604 and the respiratory waveform 106.

During a running phase the trained machine-learning framework 602 may be used to derive the predicted motion trajectory 610 independently from the respiratory waveform 106. As a result, once the machine-learning framework 602 is trained, the imaging system 600 need not use the respiratory monitoring device 104 and its respiratory waveform 106 or the motion trajectory predictor 202 and its predicted motion trajectory 206 (these elements shown in broken lines to illustrate that they may not be used during the running phase). The machine-learning framework 602 provides the predicted motion trajectory 610 responsive to the imaging data 604 independently from the respiratory waveform 106.

Figure 7:
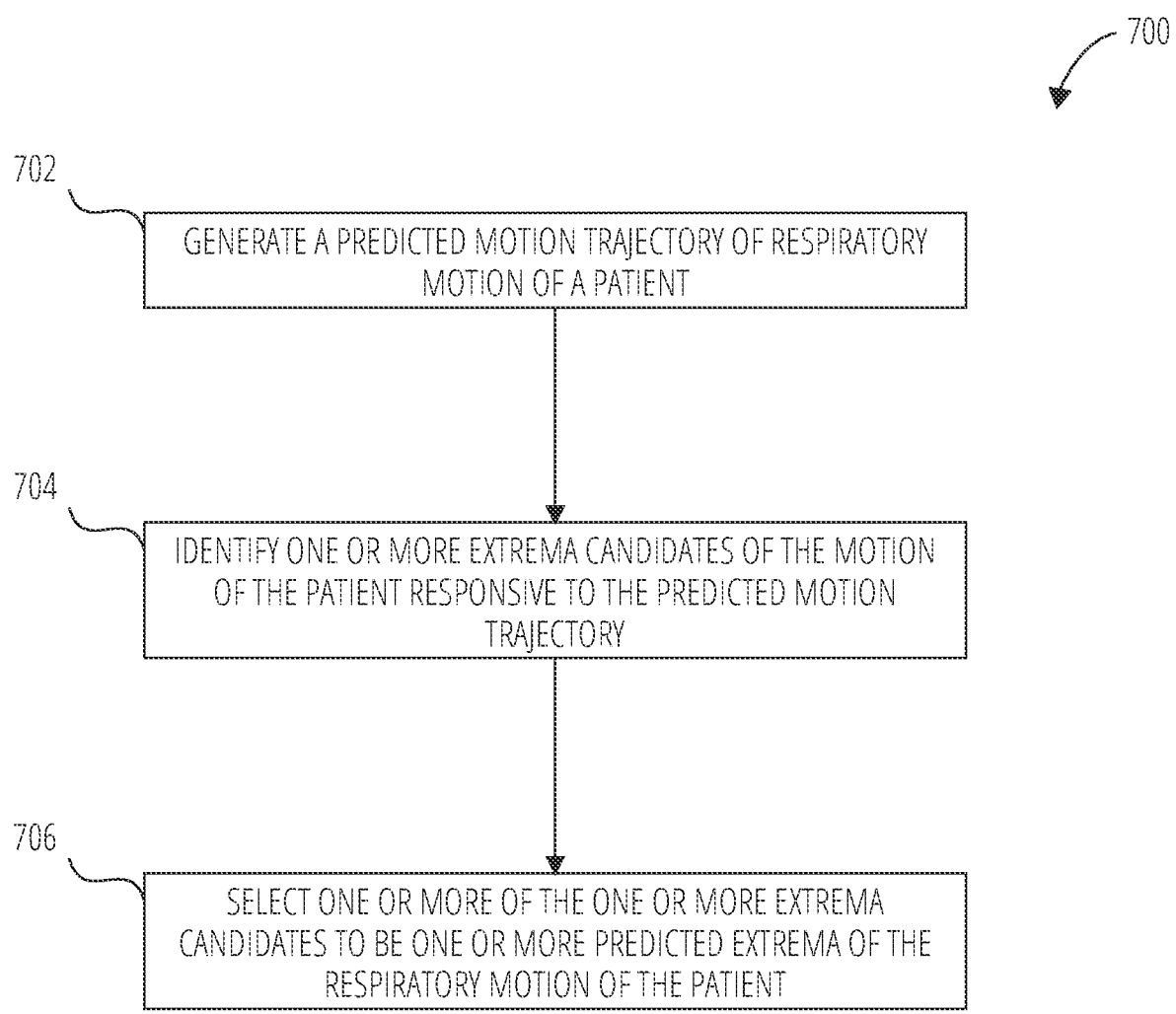
FIG. 7 is a flowchart illustrating a method of detecting extrema in respiratory motion, according to some embodiments.

FIG. 7 is a flowchart illustrating a method 700 of detecting extrema in respiratory motion, according to some embodiments. At operation 702, the method 700 includes generating a predicted motion trajectory of respiratory motion of a patient. In some embodiments, generating the predicted motion trajectory of the respiratory motion of the patient comprises generating the predicted motion trajectory responsive to a respiratory waveform provided by a respiratory monitoring device.

In some embodiments, generating the predicted motion trajectory of the respiratory motion of the patient includes training, using a respiratory waveform, a machine-learning framework to identify the predicted motion trajectory of the respiratory motion of the patient responsive to imaging data of the patient; and generating the predicted motion trajectory responsive to the imaging data of the patient. In some embodiments, generating the predicted motion trajectory responsive to the imaging data of the patient includes generating the predicted motion trajectory responsive to CT data of the patient.

In some embodiments, generating the predicted motion trajectory of the respiratory motion of the patient includes using a motion model-based predictive Kalman filter to generate the predicted motion trajectory. In some embodiments, using the motion model-based predictive Kalman filter to generate the predicted motion trajectory includes generating a process model including parameters of chest wall motion, the parameters including position, velocity, and acceleration of the chest wall. In some embodiments, the parameters may be adaptively adjusted based on a breathing rate of the patient using manual training. In some embodiments, the parameters may be adaptively adjusted based on the breathing rate of the patient using an adaptive learning algorithm. In some embodiments, generating the predicted motion trajectory of the respiratory motion of the patient includes using predictive filtering based on a direct application of an adaptive learning algorithm to generate the predicted motion trajectory.

At operation 704, the method 700 includes identifying one or more extrema candidates of the motion of the patient responsive to the predicted motion trajectory. At operation 706, the method 700 includes selecting one or more of the one or more extrema candidates to be one or more predicted extrema of the respiratory motion of the patient. In some embodiments, selecting the one or more of the one or more extrema candidates to be the one or more predicted extrema of the respiratory motion of the patient includes comparing the one or more extrema candidates to one or more adaptive thresholds. In some embodiments, selecting the one or more of the one or more extrema candidates to be the one or more predicted extrema of the respiratory motion of the patient includes comparing the one or more extrema candidates to a history of extrema.

Figure 8:
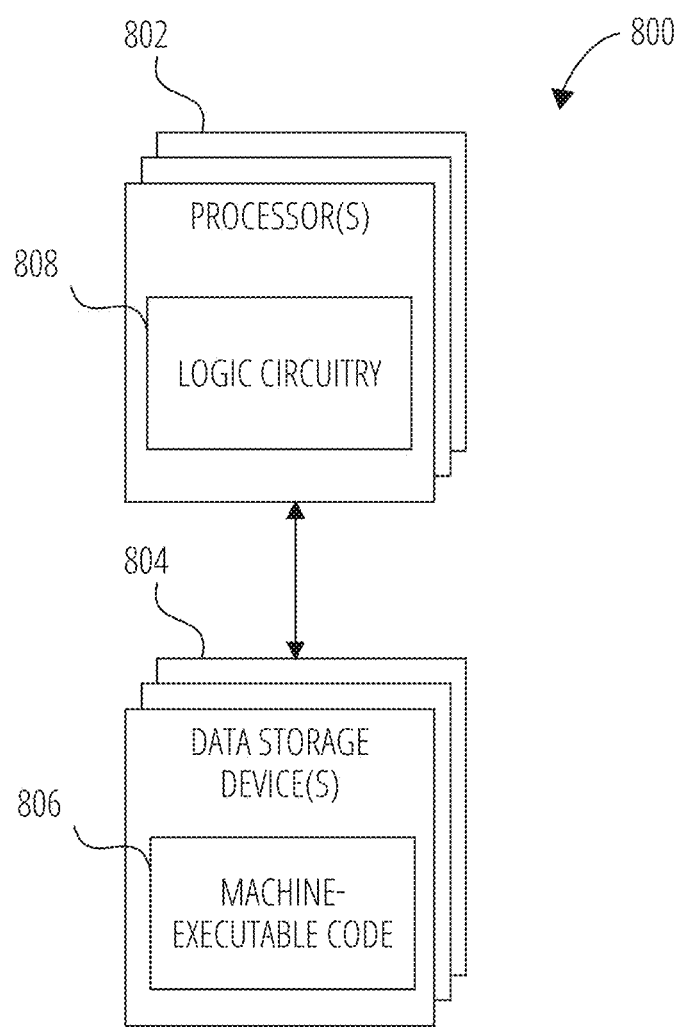
FIG. 8 is a block diagram of circuitry that, in some embodiments, may be used to implement various functions, operations, acts, processes, and/or methods disclosed herein.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 8 illustrates non-limiting examples of implementations of functional elements disclosed herein. In some embodiments, some or all portions of the functional elements disclosed herein may be performed by hardware specially configured for carrying out the functional elements.

FIG. 8 is a block diagram of circuitry 800 that, in some embodiments, may be used to implement various functions, operations, acts, processes, and/or methods disclosed herein. The circuitry 800 includes one or more processors 802 (sometimes referred to herein as "processors 802") operably coupled to one or more data storage devices (sometimes referred to herein as "storage 804"). The storage 804 includes machine-executable code 806 stored thereon and the processors 802 include logic circuitry 808. The machine-executable code 806 includes information describing functional elements that may be implemented by (e.g., performed by) the logic circuitry 808. The logic circuitry 808 is adapted to implement (e.g., perform) the functional elements described by the machine-executable code 806. The circuitry 800, when executing the functional elements described by the machine-executable code 806, should be considered as special purpose hardware configured for carrying out functional elements disclosed herein. In some embodiments, the processors 802 may be configured to perform the functional elements described by the machine-executable code 806 sequentially, concurrently (e.g., on one or more different hardware platforms), or in one or more parallel process streams.

When implemented by logic circuitry 808 of the processors 802, the machine-executable code 806 is configured to adapt the processors 802 to perform operations of embodiments disclosed herein. For example, the machine-executable code 806 may be configured to adapt the processors 802 to perform at least a portion or a totality of the method 700 of FIG. 7. As other examples, the machine-executable code 806 may be configured to adapt the processors 802 to perform at least a portion or a totality of the operations discussed for the gating signal generator 100 of FIG. 1, the extrema predictor 102 of FIG. 1, the gate generator 110 of FIG. 1 and FIG. 6, the extrema predictor 200 of FIG. 2, the motion trajectory predictor 202 of FIG. 2 and FIG. 6, the extrema candidate detector 204 of FIG. 2 and FIG. 6, the extrema refiner 208 of FIG. 2 and FIG. 6, the gating signal generator 302 of FIG. 3, the imaging system 600 of FIG. 6, the machine-learning framework 602 of FIG. 6, or combinations thereof. As a specific, non-limiting example, the machine-executable code 806 may be configured to adapt the processors 802 to receive, at an input terminal, a respiratory waveform signal, and generate predictions of extrema of the respiratory waveform signal before occurrences of the extrema responsive to at least the respiratory waveform signal, the extrema corresponding to at least one of a fully inhaled state and a fully exhaled state of a patient. In some embodiments, a respiratory monitoring device may include the processors 802. In some embodiments, the processors 802 are configured to generate respiratory gating signals responsive to the predictions of the extrema of the respiratory waveform signal and an imaging device (e.g., a CT scanning device) is configured to capture images responsive to the gating signals.

The processors 802 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine-executable code 806 (e.g., software code, firmware code, hardware descriptions) related to embodiments of the present disclosure. It is noted that a general-purpose processor (may also be referred to herein as a host processor or simply a host) may be a microprocessor, but in the alternative, the processors 802 may include any conventional processor, controller, microcontroller, or state machine. The processors 802 may also be implemented as a combination of computing devices, such as a combination of a DSP and a microprocessor, a plurality of microprocessors, one or more microprocessors in conjunction with a DSP core, or any other such configuration.

In some embodiments, the storage 804 includes volatile data storage (e.g., random-access memory (RAM)), non-volatile data storage (e.g., Flash memory, a hard disc drive, a solid-state drive, erasable programmable read-only memory (EPROM), etc.). In some embodiments, the processors 802 and the storage 804 may be implemented into a single device (e.g., a semiconductor device product, a system on chip (SOC), etc.). In some embodiments, the processors 802 and the storage 804 may be implemented into separate devices.

In some embodiments, the machine-executable code 806 may include computer-readable instructions (e.g., software code, firmware code). By way of non-limiting example, the computer-readable instructions may be stored by the storage 804, accessed directly by the processors 802, and executed by the processors 802 using at least the logic circuitry 808. Also, by way of non-limiting example, the computer-readable instructions may be stored on the storage 804, transferred to a memory device (not shown) for execution, and executed by the processors 802 using at least the logic circuitry 808. Accordingly, in some embodiments, the logic circuitry 808 includes electrically configurable logic circuitry 808.

In some embodiments, the machine-executable code 806 may describe hardware (e.g., circuitry) to be implemented in the logic circuitry 808 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, System Verilog™ or very large-scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 808 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments, the machine-executable code 806 may include an HDL, an RTL, a GL description, a mask level description, other hardware description, or any combination thereof.

In embodiments where the machine-executable code 806 includes a hardware description (at any level of abstraction), a system (not shown, but including the storage 804) may be configured to implement the hardware description described by the machine-executable code 806. By way of non-limiting example, the processors 802 may include a programmable logic device (e.g., an FPGA or a PLC) and the logic circuitry 808 may be electrically controlled to implement circuitry corresponding to the hardware description into the logic circuitry 808. Also, by way of non-limiting example, the logic circuitry 808 may include hard-wired logic manufactured by a manufacturing system (not shown but including the storage 804) according to the hardware description of the machine-executable code 806.

Regardless of whether the machine-executable code 806 includes computer-readable instructions or a hardware description, the logic circuitry 808 is adapted to perform the functional elements described by the machine-executable code 806 when implementing the functional elements of the machine-executable code 806. It is noted that although a hardware description may not directly describe functional elements, a hardware description indirectly describes functional elements that the hardware elements described by the hardware description are capable of performing.

Figure 9:
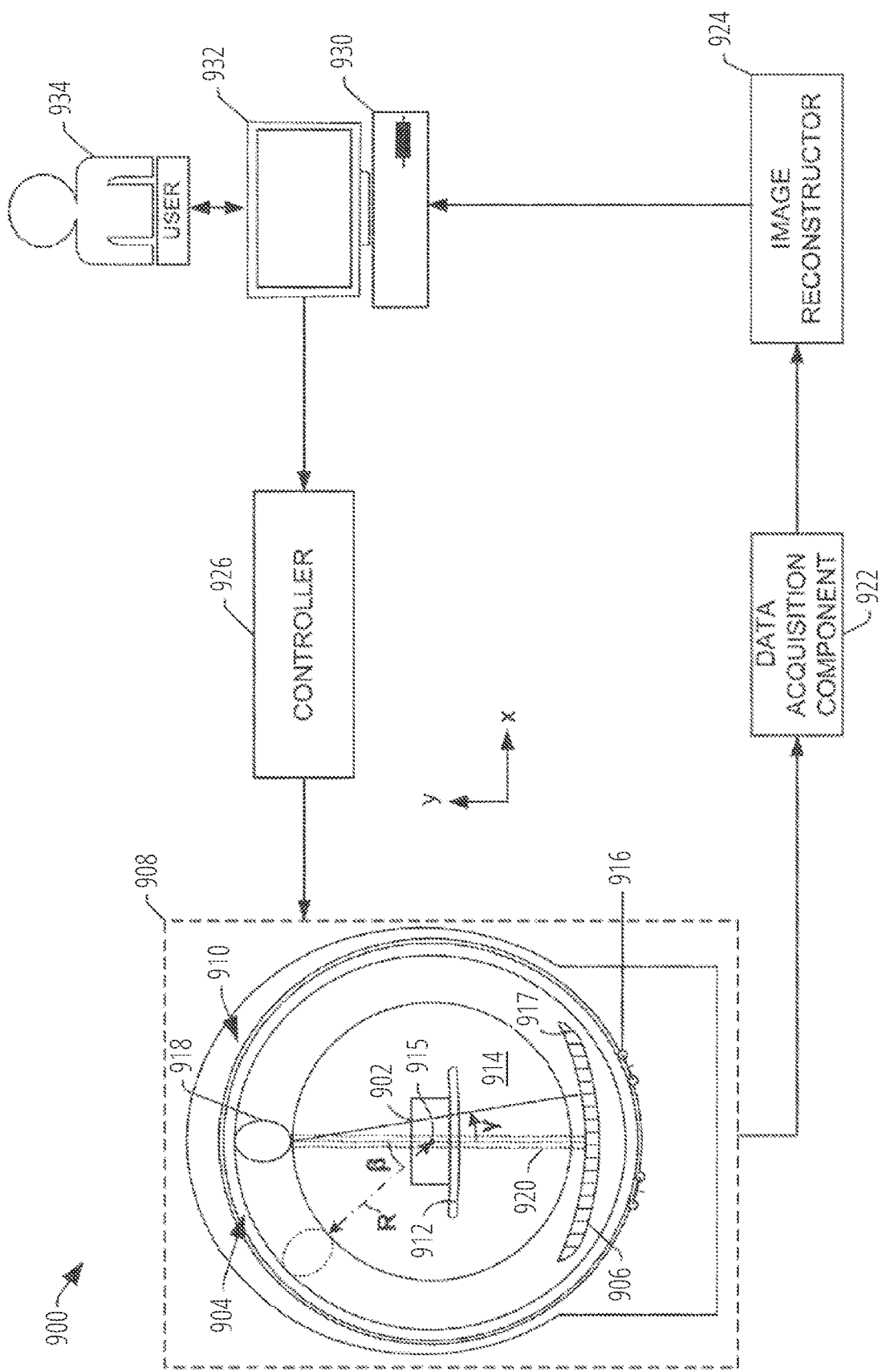
FIG. 9 is an illustration of an illustrative environment comprising a computed tomography (CT) system that may be configured to generate computed tomography images representative of an anatomical object (e.g., patient, organ, muscle, tissue, etc.) or aspect(s) thereof.

FIG. 9 is an illustration of an illustrative environment 900 comprising a computed tomography (CT) system that may be configured to generate computed tomography images representative of an anatomical object 902 (e.g., patient, organ, muscle, tissue, etc.) or aspect(s) thereof. Such a system may be employed for mitigating motion artifacts that would otherwise appear in the computed tomography images as a result of movement of the anatomical object 902 during scanning. Embodiments disclosed herein may be implemented with the illustrative environment 900, without limitation (e.g., where a CT system is used to generate a respiratory signal, or where a CT system uses a respirator signal, without limitation).

It may be appreciated that while the illustrative environment 900 in FIG. 9 describes a CT system configured to generate two-dimensional and/or three-dimensional images of the anatomical object 902 under examination, other radiation imaging modalities are also contemplated for generating images of the anatomical object 902, optionally for diagnostics purposes. Moreover, the arrangement of components and/or the types of components included in the illustrative environment 900 are merely provided as an example. By way of example, in some embodiments, a data acquisition component 922 is comprised within a detector array 906.

In the embodiment of the illustrative environment 900 in FIG. 9, an examination apparatus 908 of the CT system is configured to examine one or more anatomical objects 902, including an anatomical object prone to movement, such as the heart. With continued reference to FIG. 9, the examination apparatus 908 can comprise a rotating gantry 904 and a (stationary) support structure 910 (e.g., which may encase and/or surround at least a portion of the rotating gantry 904 (e.g., as illustrated with an outer, stationary ring, surrounding an outside edge of an inner, rotating ring)). During an examination of the anatomical object 902, the anatomical object 902 can be placed on a support article 912, such as a bed or conveyor belt, for example, that is selectively positioned in an examination region 914 (e.g., a hollow bore in the rotating gantry 904), and the rotating gantry 904 can be rotated and/or supported about an axis of rotation 915, and about the anatomical object 902 by a rotator 916, such as a motor, drive shaft, chain, roller truck, etc.

The axis of rotation 915 for a cylindrical CT system may be located at the center of the examination region 914, which is also the isocenter of the examination apparatus 908. The isocenter is the space through which the central ray of a set of beams of radiation 920 passes, and the anatomical object 902 may be positioned within the examination region 914 so the region of interest (the heart in the examples below) is centered at, or located adjacent to, the isocenter. The distance R from the radiation source(s) 918 to isocenter is represented in broken lines in FIG. 9.

The rotating gantry 904 may surround a portion of the examination region 914 and may comprise one or more radiation sources 918 (e.g., an ionizing x-ray source, gamma radiation source, etc.) and a detector array 906 that is mounted on a substantially diametrically opposite side of the rotating gantry 904 relative to the radiation source(s) 918. The rotating gantry 904 can be rotated to sweep the radiation source(s) 918 through the plurality of angular locations about the axis of rotation 915, making full 360° revolutions. The angle β in FIG. 9 generally represents the gantry angle or the source angle at the different angular locations of the views as described below. During an examination of the anatomical object 902, the radiation source(s) 918 emits fan, cone, wedge, parallel beam (shown in the drawings), and/or other shaped radiation 920 configurations from a focal spot(s) of the radiation source(s) 918 (e.g., a region within the radiation source(s) 918 from which radiation 920 emanates) into the examination region 914. It may be appreciated that such radiation 920 may be emitted substantially continuously and/or may be emitted intermittently (e.g., a brief pulse of radiation is emitted followed by a resting period during which the radiation source(s) 918 is not activated).

As the emitted radiation 920 traverses the anatomical object 902, the radiation 920 may be attenuated differently by different aspects of the anatomical object 902. Because different aspects attenuate different percentages of the radiation 920, an image(s) may be generated based upon the attenuation, or variations in the number of photons that are detected by the detector array 906. For example, more dense aspects of the anatomical object 902, such as a bone, a metal plate, electronic components, etc., may attenuate more of the radiation 920 (e.g., causing fewer photons to strike the detector array 906) than less dense aspects, such as skin or clothing.

The detector array 906 is configured to directly convert (e.g., using amorphous selenium and/or other direct conversion materials) and/or indirectly convert (e.g., using photodetectors and/or other indirect conversion materials) detected radiation into signals that can be transmitted from the detector array 906 to the data acquisition component 922 configured to compile signals that were transmitted within a predetermined time interval, or measurement interval, using various techniques (e.g., integration, photon counting, etc.). It may be appreciated that such a measurement interval may be referred to as a "view" and generally reflects signals generated from radiation 920 that was emitted while the radiation source(s) 918 was at a particular angular location relative to the anatomical object 902. Based upon the compiled signals, the data acquisition component 922 can generate projection data indicative of the compiled signals, for example.

The detector array 906 may be divided into a plurality of detector cells 917 arranged in rows and columns. Using the XYZ coordinates of FIG. 9 as a reference, the detector cells may be arranged in rows that extend in the X direction, and columns that extend in the Z direction, which is a direction parallel with the axis of rotation 915. The fan angles γ in FIG. 9 are the individual angle of each detector cell 917, as seen from the radiation source(s) 918, or the angle relative to the center ray emitted by the radiation source(s) 918. As discussed in detail below, midplane projection and backprojection data may be collected and used to compare the projections with the backprojections. Midplane data includes only projection and backprojection data acquired by a centrally located portion of the rows of the detector array 906.

For example, an embodiment of the CT system using forty (40 mm) millimeter (or four (4 cm) centimeter) collimation includes sixty-four (64) rows of detector cells to capture each of four slices that are to be assembled into a single three-dimensional image encompassing the entire heart. A set of parallel x-ray beams, referred to herein as parallel rays of radiation 920, shown in FIG. 9, emitted by the radiation source(s) 918 encounter the anatomical object 902 before being received by the detector array 906. The midplane data comprises projection and backprojection data collected by one, or a plurality of centrally located rows which, in the present example of sixty-four (64) rows (numbered sequentially), includes the 32nd and 33rd rows. The centrally located rows are used to collect the midplane data for comparing the projections and backprojections because the projections and backprojections of the centrally located rows are substantially aligned with each other. For a stationary anatomical object 902, there is little to no offset between the projections and corresponding backprojections caused by the position of the midplane detector cells relative to the radiation source(s) 918, referred to as the cone angle, for example. Thus, any differences or mismatches between the projections and backprojections detected by the detector cells in the centrally located rows is attributed to movement of the anatomical object 902 during acquisition of the projection and backprojection data.

The illustrative example of the illustrative environment 900 further comprises an image reconstructor 924 configured to receive the projection and backprojection data that is output by the data acquisition component 922. The image reconstructor 924 is configured to generate three-dimensional image data (also referred to as three-dimensional image(s)) of the anatomical object 902 from the projection data using a suitable analytical, iterative, and/or other reconstruction technique (e.g., back projection reconstruction, tomosynthesis reconstruction, iterative reconstruction, etc.). In this way, the data is converted from the two-dimensional projection, or sinogram space to a three-dimensional image space of the computed tomography images, a domain that may be more understandable by a user 934 viewing the image(s), for example.

The illustrative environment 900 further comprises a terminal 930, or workstation (e.g., a computer), that may be configured to receive the image data (e.g., output by the image reconstructor 924). The terminal 930 may also be configured to present the image data and/or information for display on a monitor 932 to the user 934 (e.g., medical personnel, etc.). In this way, the user 934 can inspect the image(s) to identify areas of interest within the anatomical object 902, possibly for diagnostic purposes. The terminal 930 can also be configured to receive user input, which can direct operations of the examination apparatus 908 (e.g., a speed of a conveyor belt), for example.

In the embodiment of illustrated environment 900, a controller 926 is operably coupled to the terminal 930. In one example, the controller 926 is configured to receive input from the terminal 930, such as user input for example, and to generate instructions for the examination apparatus 908 indicative of operations to be performed. For example, the user 934 may desire to reexamine the anatomical object 902, and the controller 926 may issue a command instructing the support article 912 to reverse direction (e.g., bringing the anatomical object 902 back into an examination region 914 of the examination apparatus 908).

It may be appreciated that the component diagram of FIG. 9 is merely intended to illustrate one embodiment of one type of imaging modality and is not intended to be interpreted in a limiting manner. For example, the functions of one or more components described herein may be separated into a plurality of components and/or the functions of two or more components described herein may be consolidated into merely a single component. Moreover, the imaging modality may comprise additional components configured to perform additional features, functions, etc., and/or some components described herein may be optional.

Extended scan data is acquired over a first range of source angles that can extend greater than 240° about the axis of rotation 915, such as at least 270° about the axis of rotation 915, or a full 360° about the axis of rotation 915, for example. Short scan data to be used to reconstruct the computed tomography image is identified by the image reconstructor 924 to include a subset, but less than all of the extended scan data. For example, the short scan data includes a portion of the extended scan data that is acquired with the radiation source(s) 918 at various angular locations within a second range of source angles. The second range of source angles constitutes a continuous block of, but less than all of the first range of source angles about the axis of rotation 915. For example, the second range of source angles can be chosen to include any block of at least 200°, at least 205°, at least 210°, at least 215°, at least 220°, at least 225°, at least 230°, or at least 240° of the first range of source angles corresponding to the extended scan data. The second range of source angles corresponds to the short scan data including the projection and backprojection data acquired with the radiation source(s) 918 at locations where the movement of the heart is less than a movement threshold, described below (e.g., while the heart is relatively stationary). For example, the heart is relatively stationary during the diastole or mid-diastole period as opposed to during the QRS complex of the cardiac cycle.

For the sake of clarity and brevity, specific examples of a system and method for reconstructing a computed tomography image are described herein. However, it is to be understood that the present disclosure is not limited to the specific numerical values utilized in the examples. Instead, the general concepts described herein are equally applicable for use with different operational parameters.

In the examples herein, the anatomical object 902 may be a beating heart, and the modality may be a CT scanner that acquires projection and backprojection data based on parallel x-ray radiation emitted by the radiation source(s) 918 at various different angular locations about the axis of rotation 915. The first range of source angles extends a full 360° about the axis of rotation 915 and the second range of source angles includes a portion of the first range of source angles that extends 225° about the axis of rotation 915. The extended scan data will include projection and backprojection data acquired at nine hundred sixty (960) views of the heart over the full (e.g., 360°) rotation about the axis of rotation 915. Thus, for each half of a full 360° scan about the axis of rotation 915, there are four hundred eighty (480) views. A computed tomography image is to be reconstructed from the data acquired from six hundred (600) of nine hundred (900) views, corresponding to the 225° second range of source angles. Again, these numerical values are merely illustrative and not meant to be exhaustive.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method, comprising:
    generating a predicted motion trajectory of respiratory motion of a patient via a respiratory motion model-based predictive Kalman filter, wherein the respiratory motion model-based predictive Kalman filter incorporates a process model that includes physical parameters of chest wall motion, the physical parameters including position, velocity, and acceleration of a chest wall;
    identifying one or more extrema candidates of respiratory motion of the patient responsive to the predicted motion trajectory;
    selecting one or more of the one or more extrema candidates to be one or more predicted extrema of respiratory motion of the patient;
    generating respiratory gating signals responsive to the one or more predicted extrema of respiratory motion of the patient; and
    providing the respiratory gating signals to an imaging device configured to capture images of the patient synchronized with the one or more predicted extrema of respiratory motion of the patient.

2. The method of claim 1, wherein generating the predicted motion trajectory of the respiratory motion of the patient comprises generating the predicted motion trajectory responsive to a respiratory waveform provided by a respiratory monitoring device.

3. The method of claim 1, wherein generating the predicted motion trajectory of the respiratory motion of the patient comprises:
    training, using a respiratory waveform, a machine-learning framework to identify the predicted motion trajectory of the respiratory motion of the patient responsive to imaging data of the patient; and
    generating the predicted motion trajectory responsive to the imaging data of the patient.

4. The method of claim 3, wherein generating the predicted motion trajectory responsive to the imaging data of the patient comprises generating the predicted motion trajectory responsive to computerized tomography (CT) data of the patient.

5. The method of claim 1, further comprising adaptively adjusting the parameters based on a breathing rate of the patient using manual training.

6. The method of claim 1, further comprising adaptively adjusting the parameters based on a breathing rate of the patient using an adaptive learning algorithm.

7. The method of claim 1, wherein generating the predicted motion trajectory of the respiratory motion of the patient comprises using predictive filtering based on a direct application of an adaptive learning algorithm to generate the predicted motion trajectory.

8. The method of claim 1, wherein selecting the one or more of the one or more extrema candidates to be the one or more predicted extrema of the respiratory motion of the patient comprises comparing the one or more extrema candidates to one or more adaptive thresholds.

9. The method of claim 1, wherein selecting the one or more of the one or more extrema candidates to be the one or more predicted extrema of the respiratory motion of the patient comprises comparing the one or more extrema candidates to a history of extrema.

10. An apparatus, comprising:
    an input terminal configured to receive a respiratory waveform signal;

one or more processors configured to:
  generate predictions of extrema of the respiratory waveform signal before occurrences of the extrema using a predictive algorithm responsive to at least the respiratory waveform signal, the predictive algorithm incorporating a respiratory motion model that models chest wall dynamics including position, velocity, and acceleration, the extrema corresponding to at least one of a fully inhaled state and a fully exhaled state of a patient;
  generate a respiratory gating signal responsive to the predictions of the extrema of the respiratory waveform; and
an imaging device configured to capture images of the patient based on the predictions of the extrema.

11. The apparatus of claim 10, further comprising a respiratory monitoring device configured to generate the respiratory waveform signal.

12. The apparatus of claim 11, wherein the respiratory monitoring device includes the one or more processors.

13. The apparatus of claim 11, wherein the respiratory monitoring device includes one or more of a laser range finder, an ultrasound reflection timing measurement device, a radio frequency range finder, a pneumatic sensor, an optical computer vision-based-target device, and an X-ray imaging device.

14. The apparatus of claim 10, wherein:
  the one or more processors are configured to generate the respiratory gating signal responsive to the predictions of the extrema of the respiratory waveform signal; and
  the imaging device is configured to capture the images responsive to the respiratory gating signal.

15. The apparatus of claim 10, wherein the imaging device comprises a computerized tomography (CT) scanning device.

16. An imaging system, comprising:
  a processor-based gating signal generator configured to provide, in real-time, predicted extrema of a respiratory waveform using a model-based Kalman filter that incorporates a respiratory motion model that models chest wall dynamics including position, velocity, and acceleration, and generate a respiratory gating signal responsive to the predicted extrema; and
  an imaging device configured to capture images of a patient responsive to the respiratory gating signal.

17. The imaging system of claim 16, wherein the gating signal generator includes an extrema predictor configured to:
  generate a predicted motion trajectory of the patient responsive to the respiratory waveform;
  provide extrema candidates responsive to the predicted motion trajectory; and
  select from the extrema candidates to provide the predicted extrema.

* * * * *